US009975441B2

(12) United States Patent
Huang et al.

(10) Patent No.: US 9,975,441 B2
(45) Date of Patent: May 22, 2018

(54) UNIFORM MAGNETIC FIELD TRANSMITTER

(71) Applicant: New York University, New York, NY (US)

(72) Inventors: Jingduo Huang, New York, NY (US); Dariusz Czarkowski, New York, NY (US); Francisco De Leon, New York, NY (US); Mariusz Bojarski, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 125 days.

(21) Appl. No.: 14/971,060

(22) Filed: Dec. 16, 2015

(65) Prior Publication Data

US 2016/0176301 A1 Jun. 23, 2016

Related U.S. Application Data

(60) Provisional application No. 62/093,321, filed on Dec. 17, 2014.

(51) Int. Cl.
*H02J 7/00* (2006.01)
*B60L 11/18* (2006.01)
(Continued)

(52) U.S. Cl.
CPC ............ *B60L 11/182* (2013.01); *H01F 38/14* (2013.01); *H02J 7/025* (2013.01); *Y02T 10/7005* (2013.01);
(Continued)

(58) Field of Classification Search
CPC ..................................................... B60L 11/182
(Continued)

(56) References Cited

U.S. PATENT DOCUMENTS

| 6,611,780 B2 | 8/2003 | Lundell et al. |
| 8,035,255 B2 * | 10/2011 | Kurs .................... B60L 11/007 307/104 |
| 2009/0102296 A1 | 4/2009 | Greene et al. |

OTHER PUBLICATIONS

Casanova, J.J., et al., "Transmitting Coil Achieving Uniform Magnetic Field Distribution for Planar Wireless Power Transfer System", Proc. 2009 Radio and Wireless Symposium, 2009, 530-533.
(Continued)

*Primary Examiner* — M'Baye Diao
(74) *Attorney, Agent, or Firm* — Foley & Lardner LLP

(57) ABSTRACT

A system for wirelessly charging an electric vehicle comprises a wireless charging coil having a first end, a second end, and a plurality of turns. The first end has a first turn having a first radius $r_1$ and the second end has an $N^{th}$ turn having an $N^{th}$ radius $r_N$, $r_N < r_1$ such that the wireless charging coil is funnel shaped,
where, an ascending distance between each adjacent turn of the wireless charging coil is:

$$\Delta'_{j,j+1} = \Delta_{j+i-3, j+i-2} + (\Delta'_{34} - \Delta_{i,i+1}), \text{ for } j \geq 4 \text{ and } r'_{j+1} > 0$$

where,
$\Delta'_{j,j+1} = r'_j - r'_{j+1}$ is the distance between adjacent turns,
σ is between 0.05% and 0.2%,
i is 2 to N;
j is 1 to N; and
$\Delta'_{34}$ is an ascending distance between the third turn and the fourth turn.

12 Claims, 26 Drawing Sheets

(51) Int. Cl.
  *H01F 38/14* (2006.01)
  *H02J 7/02* (2016.01)
(52) U.S. Cl.
  CPC .......... *Y02T 10/7072* (2013.01); *Y02T 90/122* (2013.01); *Y02T 90/14* (2013.01)
(58) Field of Classification Search
  USPC ........................................................ 320/108
  See application file for complete search history.

(56) References Cited

OTHER PUBLICATIONS

Diao, Y., et al., "Design of Coil Structure Achieving Uniform Magnetic Field Distribution for Wireless Charging Platform", Proc. 2011 Power Electronics Systems and Applications (PESA), 2011, 1-5.
Everett, J.E., et al., "Spherical coils for uniform magnetic fields", J. Sci. Instrum., 1966, 43:470-474.
Fotopoulou, K., et al., "Wireless Power Transfer in Loosely Coupled Links: Coil Misalignment Model", IEEE Transactions on Magnetics, Feb. 2011, 47(2):416-430.
Gottardi, G., et al., "A Four Coil Exposure System (Tetracoil) Producing a Highly Uniform Magnetic Field", Bioelectromagnetics, 2003, 24:125-133.
Kim, JW., et al., "Wireless Power Transfer for Free Positioning using Compact Planar Multiple Self-Resonators", Proc. 2012 Microwave Workshop Series on Innovative Wireless Power Transmission: Technologies, Systems, and Applications (IMWS), IEEE MTT-S International,2012, 127-130.
Krishnan, S., et al., "Frequency agile resonance-based wireless charging system for Electric Vehicles", Proc. 2012 IEEE International Electric Vehicle Conference (IEVC), 2012, 1-4.
Liu, X., et al., "Optimal Design of a Hybrid Winding Structure for Planar Contactless Battery Charging Platform", IEEE Transactions on Power Electronics, Jan. 2008, 23(1):455-463.
NYC Department of City Planning, "Design standards for commercial and community facility parking lots", Aug. 2007, 22 pages.
Restrepo-Alvarez, A.F., et al., "Study and analysis of magnetic field homogeneity of square and circular Helmholtz coil pairs: A Taylor series approximation", Proc. 2012 Andean Region International Conf. (ANDESCON), 2012, 77-80.
Shin, J., et al., "Design and Implementation of Shaped Magnetic-Resonance-Based Wireless Power Transfer System for Roadway-Powered Moving Electric Vehicles", IEEE Transactions on Industrial Electronics, Mar. 2014, 61(3):1179-1192.
Smythe, W.R., Static and Dynamic Electricity, 3rd Ed., 1968, p. 267, McGraw-Hill, New York.
Stratton, J.A., et al., "Diffraction Theory of Electromagnetic Waves", Physical Review, Jul. 1, 1939, 56:99-107.
Takanashi, H., et al., "A Large Air Gap 3 kW Wireless Power Transfer System for Electric Vehicles", Proc. 2012 IEEE Energy Conversion Congress and Exposition (ECCE), 2012, 269-274.
Waffenschmidt, E., "Free positioning for inductive wireless power system", Proc. 2011 IEEE Energy Conversion Congress and Exposition (ECCE), 2011, 3480-3487.
Wang, J., "Analytical Design Study of a Novel Witricity Charger With Lateral and Angular Misalignments for Efficient Wireless Energy Transmission", IEEE Transactions on Magnetics, Oct. 2011, 47(1):2616-2619.
Xu, Q., et al., "A Novel Mat-Based System for Position-Varying Wireless Power Transfer to Biomedical Implants", IEEE Transactions on Magnetics., Aug. 2013, 49(8):4774-4779.
Zhong, W.X., et al., "Analysis on a Single-Layer Winding Array Structure for Contactless Battery Charging Systems with Free-positioning and Localized Charging Features", Proc. 2010 IEEE Energy Conversion Congress and Exposition (ECCE), 2010, 658-665.

* cited by examiner

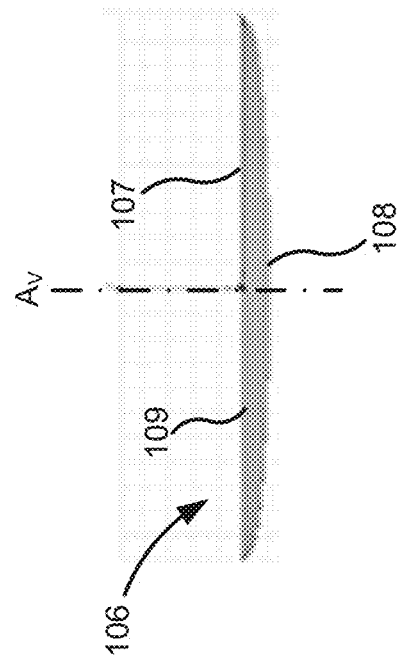
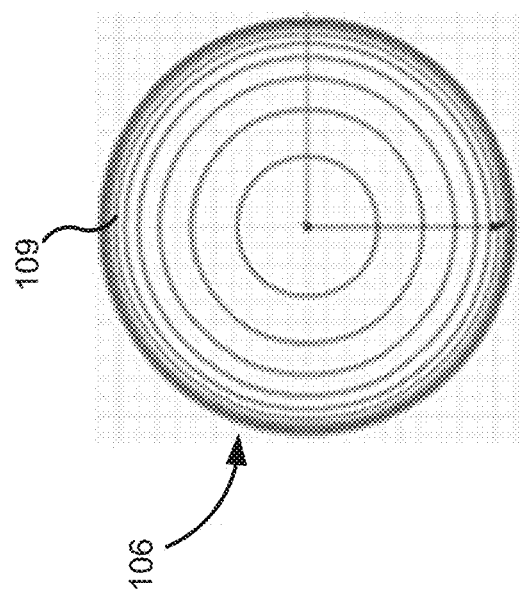

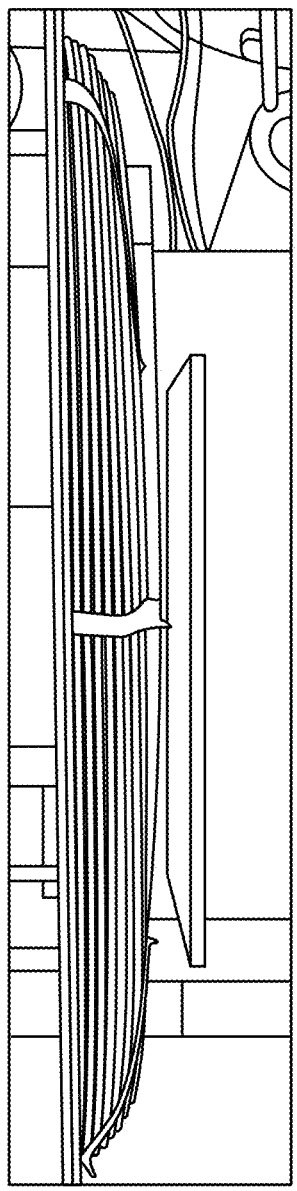

UNIFORM MAGNETIC FIELD TRANSMITTER

CROSS-REFERENCE TO RELATED APPLICATIONS

This application claims the benefit of priority to U.S. Provisional patent application No. 62/093,321, filed Dec. 17, 2014, entitled "Uniform Magnetic Field Transmitter," and the entire disclosure of which is incorporated herein by reference.

TECHNICAL FIELD

The present disclosure relates generally to wireless charging systems for electric vehicles.

BACKGROUND

Wireless power transfer technology was first developed for charging small electric devices, such as toothbrushes and cell phones. Wireless charging systems have now found applications in wireless charging of electric vehicles (EVs). Such EVs include a wireless receiver for receiving a magnetic field from the wireless transmitter and charge a battery of the EV. A key challenge in wirelessly charging EVs is accurate positioning of the EV over the wireless transmitter disposed on the parking spot for efficient charging. Misalignment between the transmitter and receiver can significantly impair the power transfer efficiency. If the magnetic field of transmitter is uniform, misalignment can be tolerated thus making it easy to park the EV over the wireless transmitter.

State of the art wireless transmitters however do not produce a constant magnetic field. The magnetic field intensity of most wireless transmitters is not constant. The uniformity of the magnetic field depends on the size of the receiver coil. Coils that are too small do not provide efficient charging. Furthermore, state of the art wireless transmitters are not designed for the scale of electrical vehicle charging, and either have a small coil size or with distance of only a few millimeters between the transmitter and receiver.

SUMMARY

Embodiments described herein relate generally to wireless charging systems and in particular to wireless charging systems that include a funnel shaped wireless charging coil for charging EVs, and methods to determine turn distributions of such charging coils.

In some embodiments, a non-transitory computer readable medium for determining horizontal and vertical turn distributions of a wireless charging coil, when executed by a computing device, causes the computing device to perform operations, comprises setting a number of turns (N) of the wireless charging coil to be equal to 0 and a parameter g to be equal to 0. An initial turn distribution of the wireless charging coil is calculated. A horizontal turn distribution of the wireless charging coil is adjusted and a vertical turn distribution of the wireless charging coil is set. The redundant turns of the wireless charging coil are removed and a depth (d) of the wireless charging coil is set to be equal to 0. It is determined if a uniformity factor satisfies a predetermined requirement. If the uniformity factor does not satisfy a predetermined requirement, it is determined if the depth d<a maximum depth $(d_{max})/N$. A value of d is incremented in response to d<a maximum depth $(d_{max})/N$, and it is determined if g<20 in response to d not less than $d_{max}/N$. A value of g is incremented, in response to g<20. Furthermore, a value of N is incremented in response to g not less than 20. A horizontal and vertical turn distribution of the wireless charging coil is determined in response to the uniformity factor satisfying the predetermined requirement. The horizontal and vertical turn distribution of the wireless charging coil is displayed to a user.

In some embodiments, a system for wirelessly charging an electric vehicle comprises a wireless charging coil having a first end, a second end, and a plurality of turns. The first end has a first turn having a first radius $r_1$ and the second end has an $N^{th}$ turn having an $N^{th}$ radius $r_N$, $r_N<r_1$ such that the wireless charging coil is funnel shaped, where, an ascending distance between each adjacent turn of the wireless charging coil is:

$$\Delta'_{j,j+1}=\Delta_{j+i-3,j+i-2}+(\Delta'_{34}-\Delta_{i,i+1}), \text{ for } j\geq 4 \text{ and } r'_{j+1}>0$$

where,
$\Delta'_{j,j+1}=r'_j-r'_{j+1}$ is the distance between adjacent turns,
σ is between 0.05% and 0.2%,
i is 2 to N;
j is 1 to N; and
$\Delta'_{34}$ is an ascending distance between the third turn and the fourth turn.

In some embodiments, a method for determining horizontal and vertical turn distributions of a wireless charging coil comprises setting a number of turns (N) of the wireless charging coil to be equal to 0 and a parameter g to be equal to 0. An initial turn distribution of the wireless charging coil is calculated. A horizontal turn distribution of the wireless charging coil is adjusted and a vertical turn distribution of the wireless charging coil is set. The redundant turns of the wireless charging coil are removed and a depth (d) of the coil is set to be equal to 0. It is determined if a uniformity factor satisfies a predetermined requirement. If the uniformity factor does not satisfy a predetermined requirement, it is determined if the depth d<a maximum depth $(d_{max})/N$. A value of d is incremented in response to d<a maximum depth $(d_{max})/N$, and it is determined if g<20 in response to d not less than $d_{max}/N$. A value of g is incremented, in response to g<20. Furthermore, a value of N is incremented in response to g not less than 20. A horizontal and vertical turn distribution of the wireless charging coil is determined in response to the uniformity factor satisfying the predetermined requirement. Forming the wireless charging coil such that the wireless charging coil includes the determined horizontal and vertical turn distribution.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 2A is a top view and FIG. 2B is a side view of a funnel shaped wireless charging coil included in the system of FIG. 1, according to an embodiment.

FIG. 17B is a bottom view and FIG. 17C is a side view of the wireless charging coil of FIG. 17A.

FIG. 18A is a measuring coil and FIG. 18B is a power transfer coil.

Figure 1:
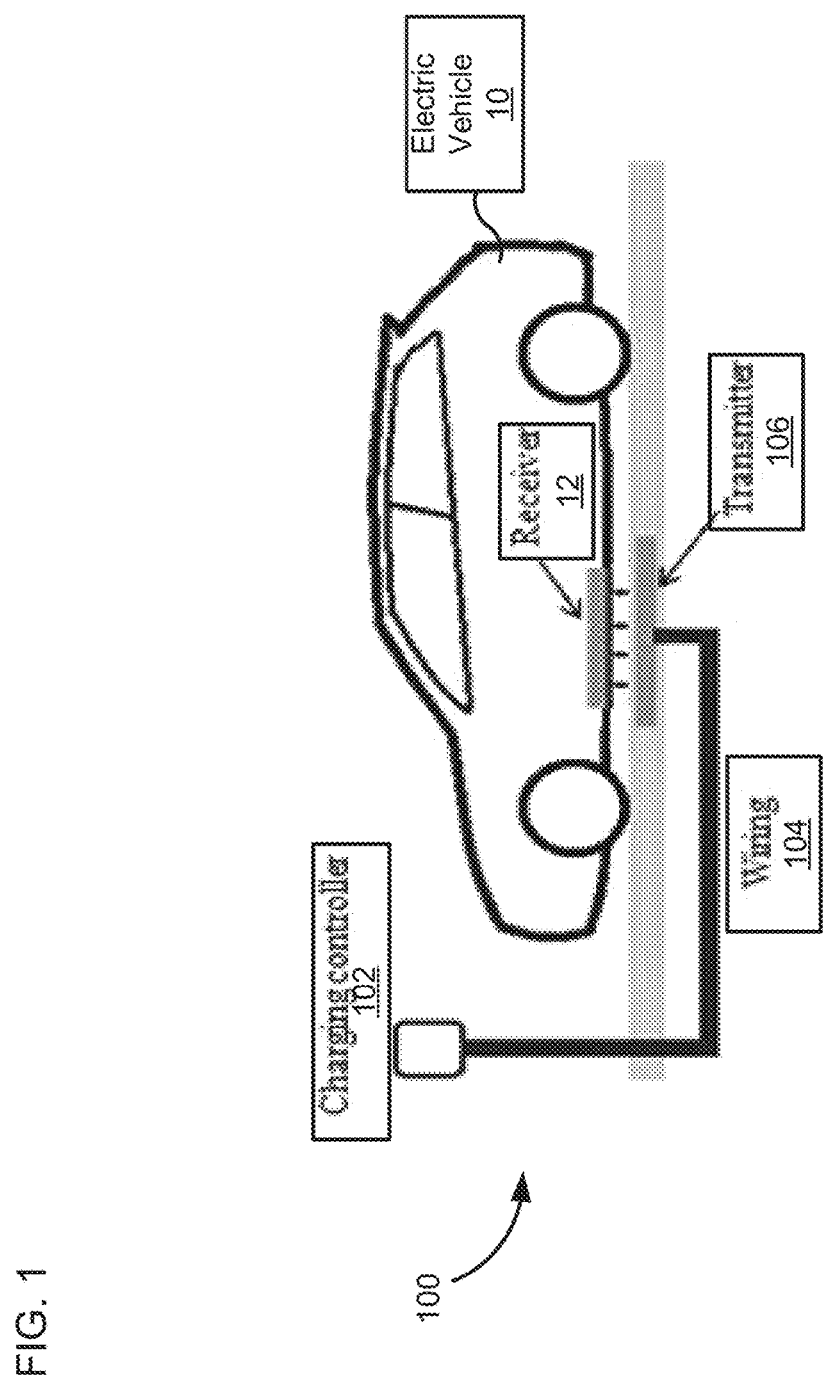
FIG. 1 is an illustration of a wireless charging system according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to wireless charging systems and in particular to wireless charging systems that include a funnel shaped wireless charging coil for charging EVs, and methods to determine turn distributions of such charging coils. Certain embodiments of the magnetic field transmitter described herein provide several benefits including, for example: (1) providing a funnel shaped wireless charging coil for EVs that produces a uniform magnetic field; (2) removing redundant turns from the wireless charging coil; (3) reducing ripples in the electromagnetic field produced by the wireless charging coil; and (4) producing a magnetic field to cover a sufficiently large area of a parking spot allowing an EV operator to position the EV receiver over the wireless charging coil with relative ease and flexibility.

FIG. 1 is an illustration of a system 100 for wirelessly charging an electric vehicle 10 which includes a wireless receiver 12 (e.g., an induction coil). The system 100 includes a charging controller 102, a transmitter 106 and wiring 104 which electrically couples the charging controller 102 to the transmitter 106.

The charging controller 102 is configured to control the power signal produced by the transmitter 106 (e.g., control the strength of the magnetic field produced by the transmitter 106). Furthermore, the charging controller 102 can also be configured to monitor the magnetic field produced by the transmitter 106 which includes a wireless charging coil (hereinafter "the coil 106").

The coil 106 is structured to produce a uniform magnetic field. Referring also now to FIG. 2, the coil 106 includes a first end 107, a second end 108 and a plurality of turns 109. The first end 107 has a first turn which has a first radius $r_1$. The second end has an $N^{th}$ turn which has an $N^{th}$ radius $r_N$ such that $r_N < r_1$ and the wireless charging coil 106 is funnel shaped. Furthermore, an ascending distance between each adjacent turn 109 of the wireless charging coil 106 is:

$$\Delta'_{j,j+1} = \Delta_{j+i-3, j+i-2} + (\Delta'_{34} - \Delta_{i, i+1}), \text{ for } j \geq 4 \text{ and } r'_{j+1} > 0$$

wherein, $\Delta'_{j,j+1} = r'_j - r'_{j+1}$ is the distance between adjacent turns, σ is between 0.05% and 0.2%, i is 2 to N;

j is 1 to N; and $\Delta'_{3,4}$ is an ascending distance between the third turn and the fourth turn.

Expanding further, the coil 106 is funnel shaped such that the plurality of circular turns 109 are aligned along a longitudinal axis $A_v$, in the vertical direction relative to the EV 10. The structure of the coil 106 eliminates any ripples in the magnetic field strength curve along the radial direction by introducing height differences among adjacent turns 109 and thus yields a smooth uniform field. The key parameters of the coil 106 include the position of each turn 109 along the radial direction (i.e., the horizontal turn distribution), and the depth of each turn 109 relative to the ground (i.e., vertical turn distribution).

For wirelessly charging the electric vehicle 10, a uniformity requirement of the magnetic field is generally restricted to a fixed height, i.e. the height of the receiver 12 on the EV 10 to the ground of the parking spot on which a coil is disposed, which is defined as the operation plane. The axial magnetic field strength of a funnel shaped coil with N turns along the radial direction is the sum of the field strength generated by each individual turn inside of it:

$$H_Z(x,R,Z) = \sum_{i=1}^{N} H_{Zi}(x, r_i, z_i) \qquad (1)$$

where x is the horizontal distance from a given point on the operation plane to the coil axis, $H_{Zi}(x, r_i, z_i)$ is the axial magnetic field strength generated by the i-th turn in the coil at position x, $r_i$ is the turn radius, and $z_i$ is the turn's vertical distance to the operation plane. $R = \{r_1, r_2, \ldots, r_N\}$, $Z = \{z_1, z_2, \ldots, z_N\}$ represent the coil's horizontal and vertical turn distribution, respectively. $H_Z(x, R, Z)$ is abbreviated as $H_Z(x)$ or $H_Z$ hereinafter.

The uniformity of a magnetic field generated by the funnel shaped coil can be evaluated by the maximum percentage difference strength along the radial direction, which is defined as uniformity factor ($\lambda_{uniform}$) herein:

$$\lambda_{uniform} = (\max(H_z) - \min(H_z))/\max(H_z) \qquad (2)$$

The field uniformity is deemed as near-ideal if its uniformity factor is smaller than a given threshold (for example, 12% in one embodiment).

Figure 3:
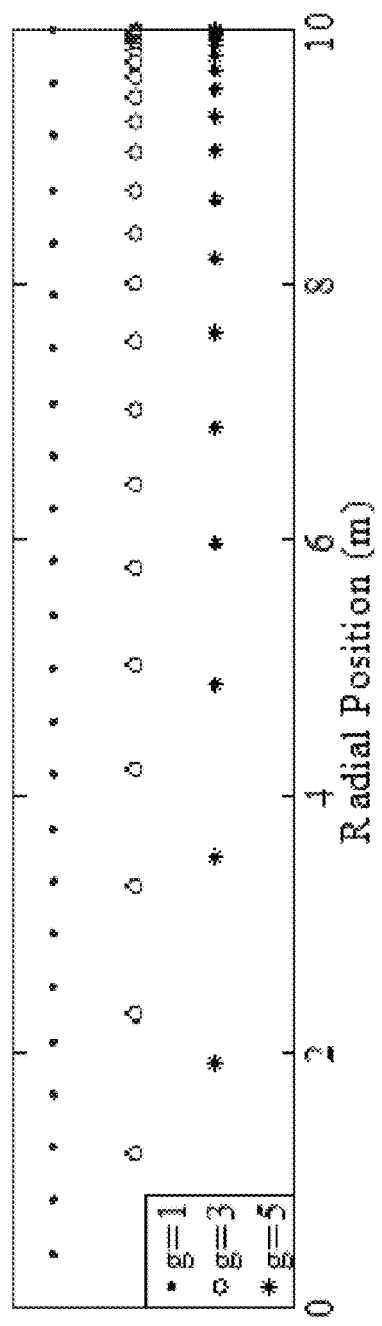
FIG. 3 is a plot of horizontal distribution of coils of a planar charging coil at various values of parameter g.
Figure 4:
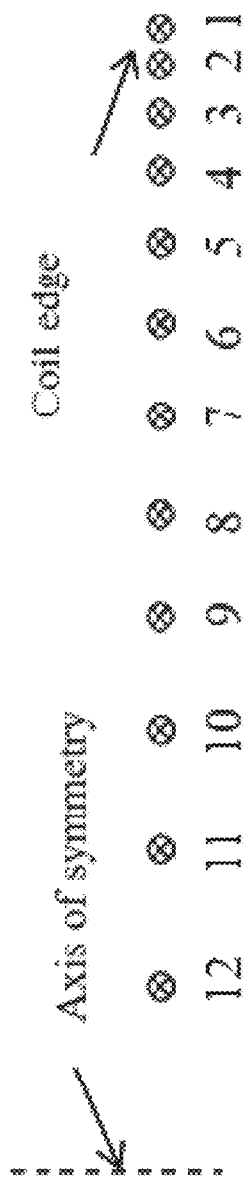
FIG. 4 is a plot of horizontal turn distributions of a planar coil, according to one embodiment.

For a planar circular coil that has N turns and the radius of each turn is denoted as $r_n$ and given the radius of the 1st turn $r_1$ (i.e. the overall radius of the coil), the radius of the other turns may be determined as follows:

$$r_n = (1 - f_n) \times r_1 \qquad (3)$$

where $$f_n = (n-1)^g / N \qquad (4)$$

and g is a parameter for adjusting the horizontal turn distribution. Varying the value of g produces a plurality of solutions for the horizontal coil distribution as shown in FIG. 3 with N=24. An example planar turn distribution determined by equation 3 is shown in FIG. 4, where turns are labeled as 1, 2, 3, ..., N from the edge to the axis of the coil. The horizontal distance between two adjacent turns is denoted as $\Delta_{n,n+1} = r_n - r_{n+1}$. A noticeable characteristic of the turn distribution is that the distances between adjacent turns increases from the edge to the axis of the coil, i.e. $\Delta_{12} < \Delta_{23} < \ldots < \Delta_{N-1,N}$, hereinafter referred to as the ascending turn distance. The ascending turn distance can help avoid early drop of field strength near the edge of the coil, and thus increase the uniform area of the field.

Figure 5:
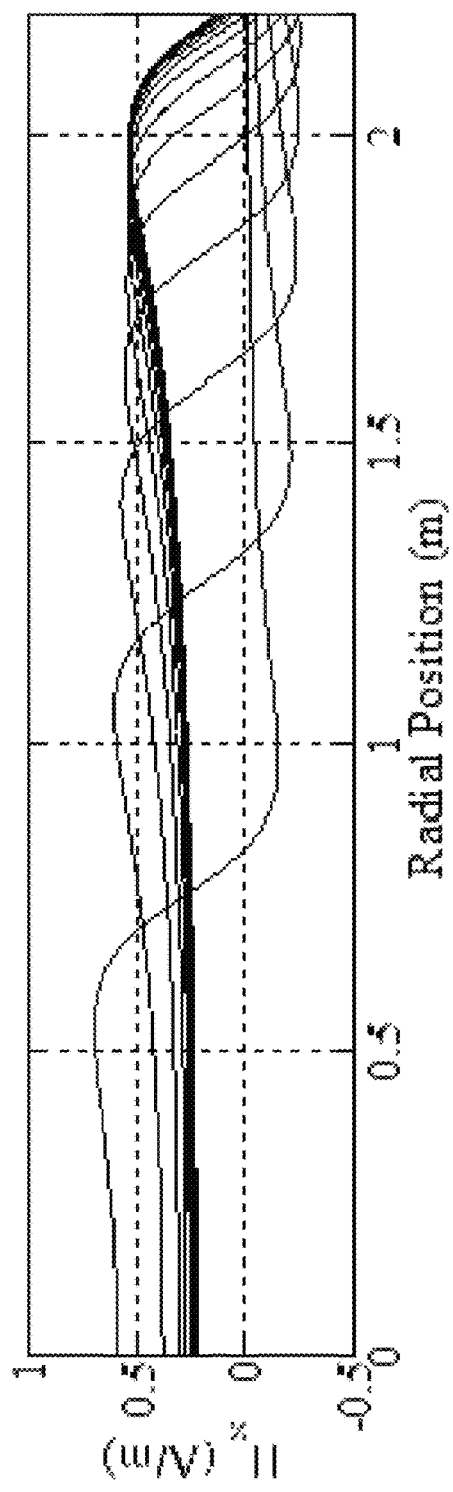
FIG. 5 is a plot of magnetic field produced by each turn of a planar circular coil that has a radius of about 2.2 meters.
Figure 6:
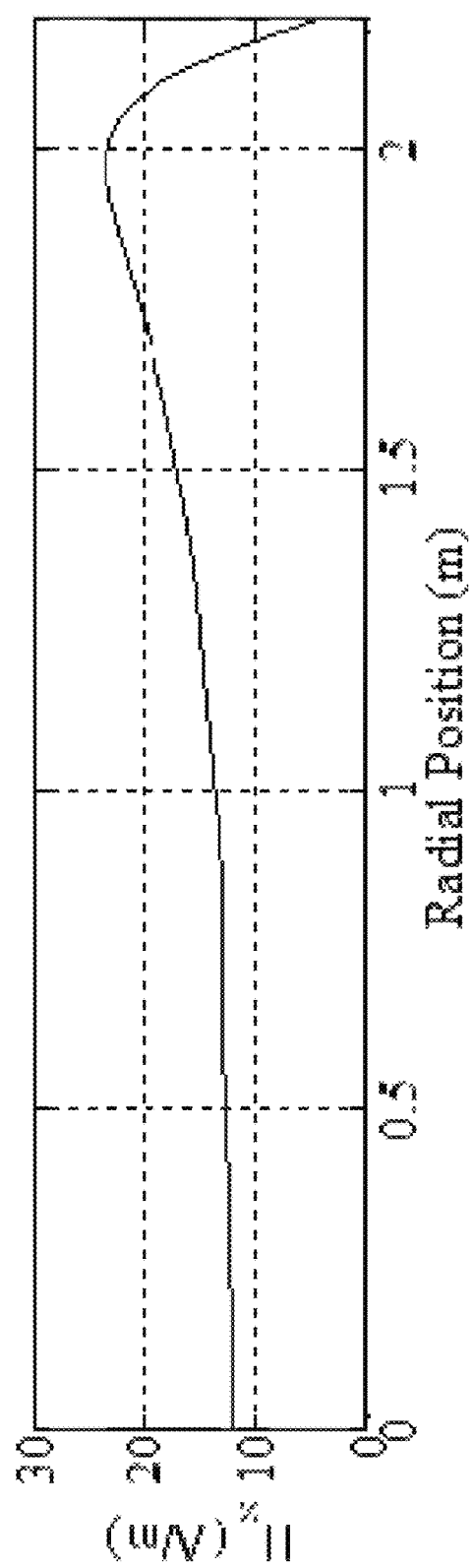
FIG. 6 is plot of overall magnetic field of a planar circular could that has a radius of about 2.2 meters.
Figure 7:
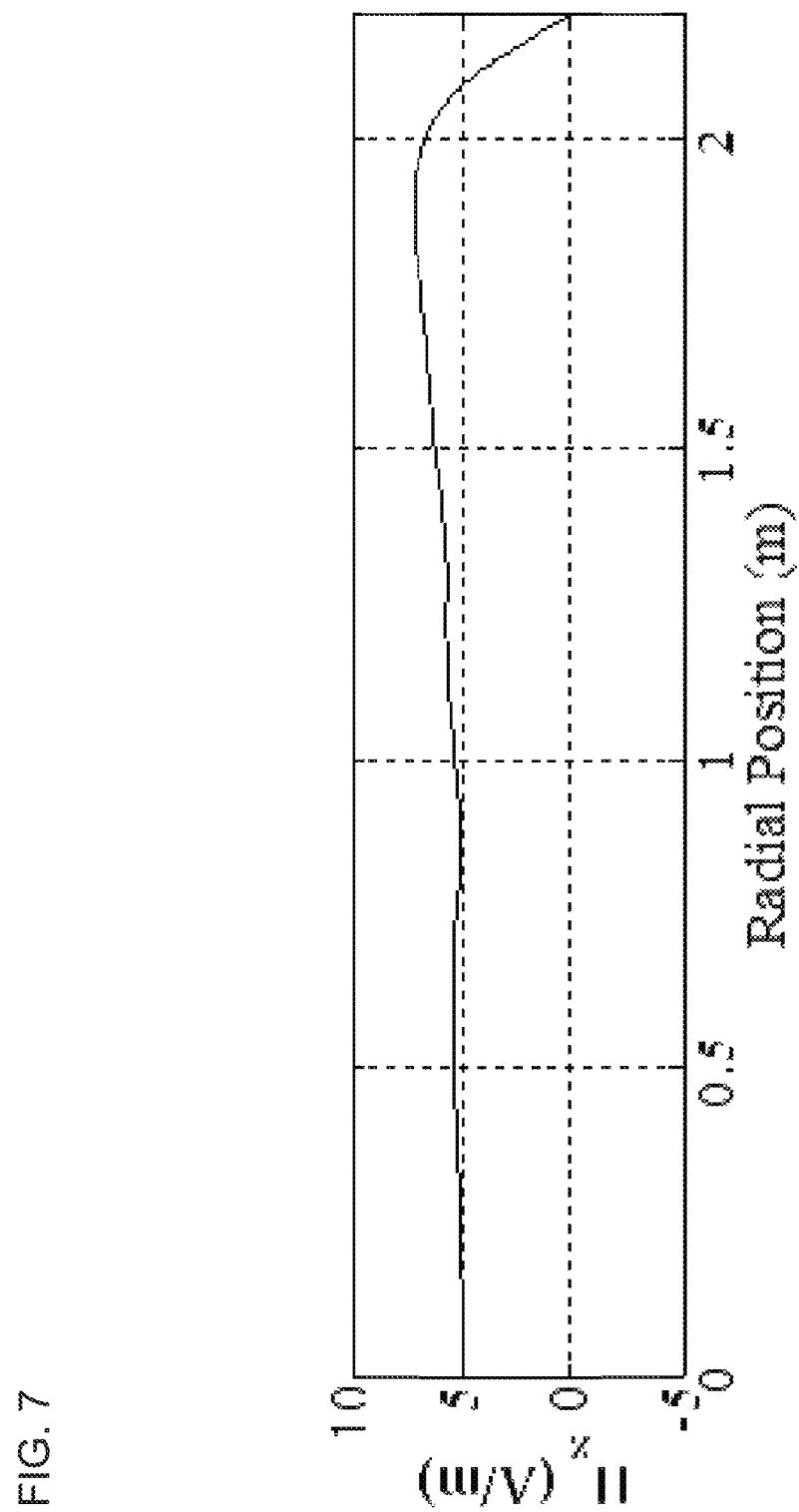
FIG. 7 is a plot of overall magnetic field of the planar circular coil of FIG. 6 after removing a $2^{nd}$ and a $32^{nd}$ turn of the coil.

However, when g and N are large, turns at the edge of the coil become too close to each other, which may cause a peak in the magnetic field strength near the edge of coil. For example, for a 2.2 m radius coil with N=50 and g=21, the radius of the first 32 turns lie within 0.001 meter. FIGS. 5 and 6 show the calculated field strength curves along the radial direction of the coil produced by each individual turn and the overall field strength curve, respectively. There is a significant peak near the edge of the coil which cannot be eliminated even after removing the $2^{nd}$ turn to the $32^{nd}$ turn. The resulting field distribution is shown in FIG. 7.

Figure 8:
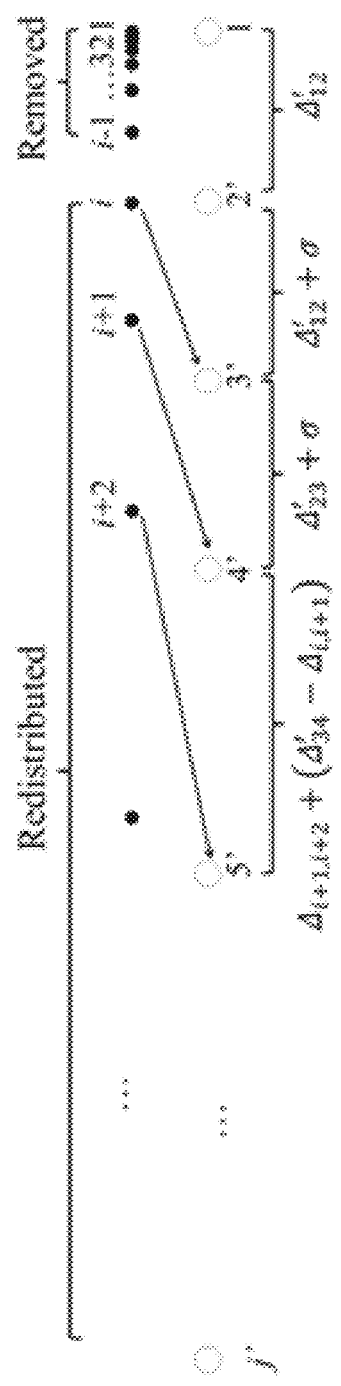
FIG. 8 is an illustration of a method for adjusting horizontal turn distribution of a planar circular coil.

To achieve the funnel shaped coil 106 which includes an optimum horizontal turn distribution of the plurality of turns 109 an initial horizontal turn distribution is produced with $R = \{r_1, r_2, \ldots, r_N\}$. The $2^{nd}$ turn from the edge is then relocated to increase its distance to the $1^{st}$ turn which is located at the first end 107 of the coil 106. With the new $2^{nd}$ turn position, the rest of the turns are either removed or redistributed to maintain the ascending turn distance. Assuming the $2^{nd}$ turn is relocated to a new position $r'_2$ and $r_i < r'_2 < r_{i-1}$ (i.e. the new $2^{nd}$ turn is located between the (i−1)-th and i-th turns in the initial turn distribution), then all turns between the new $2^{nd}$ turn and the coil edge in the initial turn distribution are removed, and the rest of the turns are relocated as follows and is shown in FIG. 8:

$$\Delta'_{j,j+1} = \Delta_{j+i-3,j+i-2} + (\Delta'_{34} - \Delta_{i,i+1}), \text{ for } j \geq 4 \text{ and } r'_{j+1} > 0$$

wherein, $\Delta'_{j,j+1} = r'_j - r'_{j+1}$ is the distance between adjacent turns, σ is between 0.05% and 0.2%, i is 2 to N;

j is 1 to N; and $\Delta'34$ is an ascending distance between the third turn and the fourth turn.

σ is a constant which serves to ensure the ascending distance among the first four turns 109. Furthermore, each of the plurality of turns 109 conform to the ascending turn distribution.

The position $\Delta'_{12}$ is determined by minimizing the variance $\text{var}(H_z)$ of the field strength $H_Z(x)$ as:

$$\text{var}(H_z) = \frac{1}{M} \sum_{i=1}^{M} (H_z(x_i) - \overline{H_z(x_l)})^2 \qquad (5)$$

where, $x_i$ is between 0 and $0.84 r_1$ (i.e., ensure uniformity within 84% of the coil radius), and $\overline{H_z(x_1)}$ is the average of field strength at the sampled points.

The value of $\Delta'_{12}$ is determined by a grid search within an empirical range of 0.25% to 0.9% of the coil radius to minimize the $\text{var}(H_z)$. The grid search step size $\delta_{12}$ can be set according to a predetermined precision need.

Figure 9:
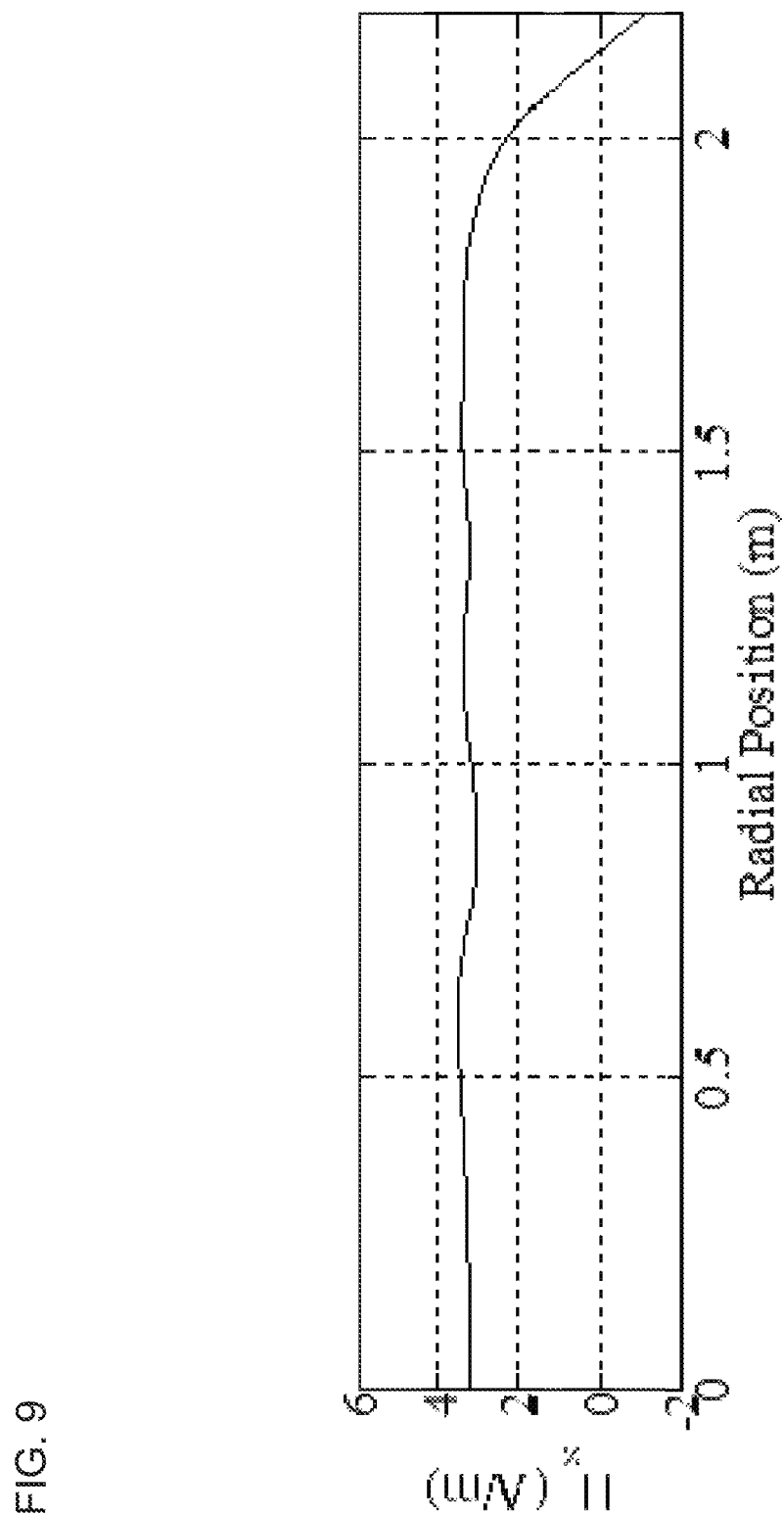
FIG. 9 is a plot of overall magnetic field of a planar circular coil having a 2.2 meter diameter after adjustment of horizontal turn distribution.

Planar coils tend to produce magnetic fields that include numerous ripples as shown in FIG. 9. To address this, vertical turn distributions are included in the coil 106 such that the coil 106 has a funnel shape and produces a uniform magnetic field. Furthermore, redundant turns along the vertical axis $A_v$ are removed such that the plurality of turns 109 included in the coil 106 are distributed uniformly along the vertical axis Av of the coil 106.

Figure 10:
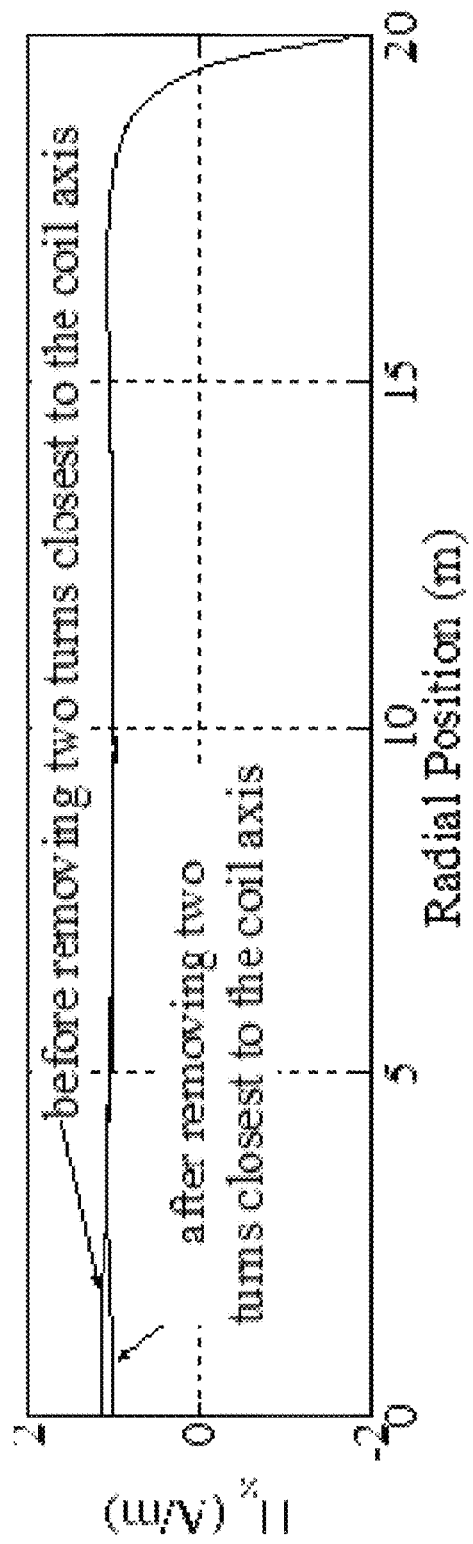
FIG. 10 is a plot of overall magnetic field of a coil having a radius of about 20 meters before and after removing turns near the coil axis.

The magnetic field generated by a single circular turn in the coil 106 can be expressed as $$\vec{H} = \frac{1}{4\pi} \int \frac{d\vec{l} \times \vec{e}}{|\vec{e}|^3} \qquad (6)$$

where $\vec{e}$ is the distance vector from the turn to the point at which the field is calculated. The magnitude of $d\vec{l}$ is the length of the differential element of the turn. A turn with smaller radius tends to produce larger field strength near its axis. After adjusting the horizontal turn distribution as described above, turns close to the coil axis may end up with small radius, and thus produce higher field strengths near the coil axis. The solution is to gradually remove turns that are close to the coil axis to tune the field strength in this area to a proper level. Redundant turns are removed by starting with turns that are closest to the coil axis and removing them one-by-one until the uniformity factor of the field satisfies the near-ideal uniformity condition or when 20% turns in the coil have been removed. FIG. 10 shows an example of the field strength curve before and after removing the redundant turns which are disposed near a vertical axis $A_v$ of a funnel shaped coil 106. The radius of the funnel shaped coil 106 is 20 meters.

Figure 11:
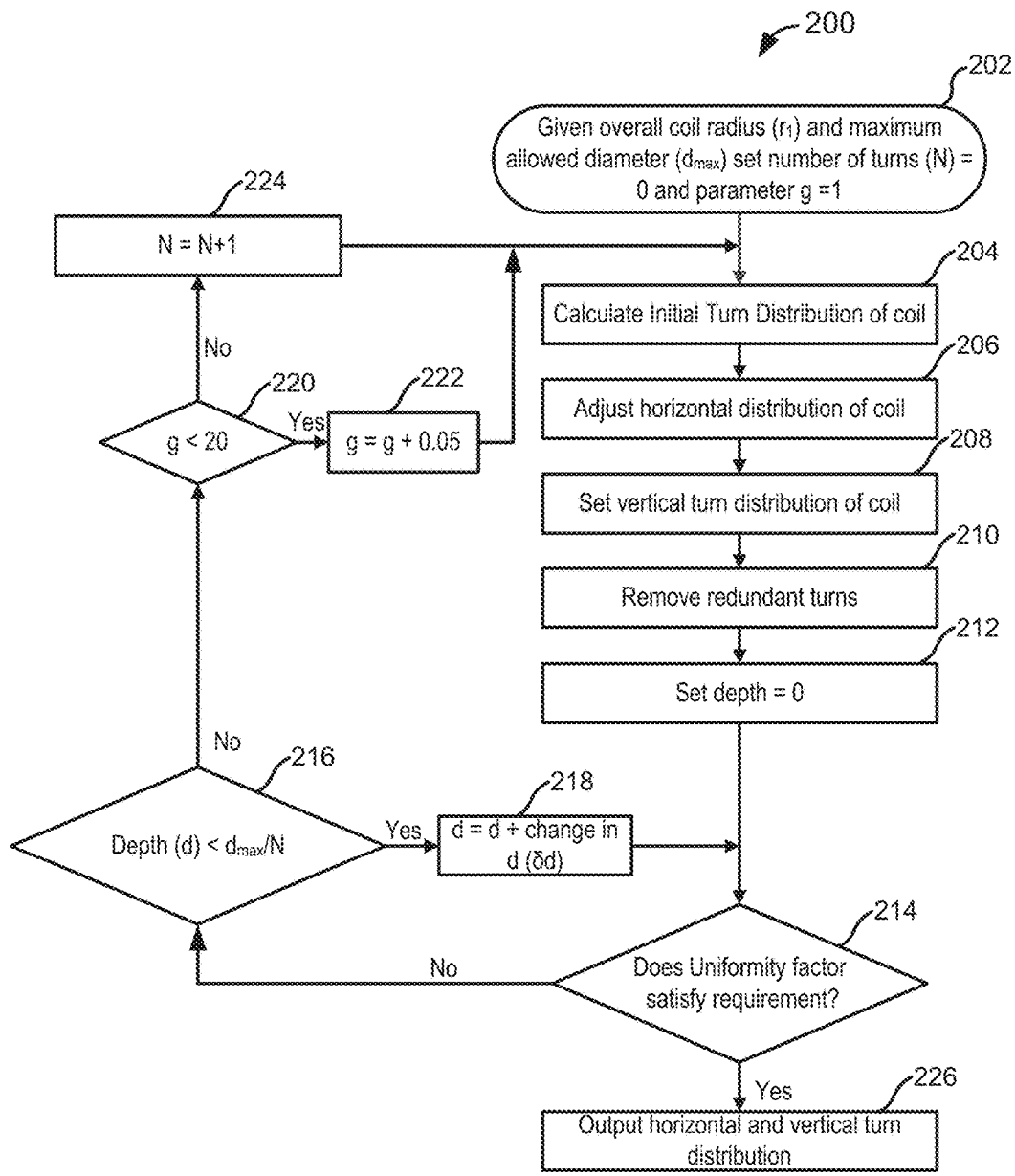
FIG. 11 is a schematic flow diagram of an exemplary method of determining the horizontal and vertical turn distribution of a funnel shaped wireless charging coil.

FIG. 11 shows an exemplary method 200 for determining horizontal and vertical turn distribution of a funnel shaped coil, for example, the coil 106 such that the coil produces a magnetic field having a near-ideal uniformity factor, and form a coil (e.g., the coil 106) therefrom. In some embodiments, the operations of the method 200 can be stored as instructions on a non-transitory computer readable medium for determining horizontal and vertical turn distributions of a wireless charging coil which can be executed by a computing device and cause the computing device to perform the operations of the method 200.

The method 200 includes setting a number of turns (N) of the coil=0 and a parameter g=0, at 202. These parameters can be set based on a predetermined overall coil radius $r_1$ and maximum allowed diameter which can be determined based on overall design needs.

An initial turn distribution of the coil is calculated, at 204. The initial turn distribution can be calculated using equations (3) and (4). A horizontal turn distribution of the coil is adjusted, at 206. The horizontal turn distribution can be adjusted as described with respect to the funnel shaped coil 106 included in the system 100, as described herein.

A vertical turn distribution of the coil is set, at 208. For example, the vertical turn distributions can be set by introducing vertical turns in a planar coil such that the planar coil is shaped into a funnel and each of the vertical turns are distributed uniformly along a vertical direction of the coil.

The redundant turns of the coil are removed, at 210. The redundant turns of the coil can be removed by gradually removing the turns that are close to the coil axis one-by-one until the uniformity factor of the field satisfies the near ideal uniformity condition or when 20% turns in the coil have been removed.

A depth (d) of the coil is set to be=0, at 212. It is determined if a uniformity factor satisfies a predetermined requirement, at 214. If the uniformity factor does not satisfy a predetermined requirement, it is determined if the depth d<a maximum depth ($d_{max}$)/N, at 216. A value of d is incremented with a step of change in d ($\delta d$) in response to d<a maximum depth ($d_{max}$)/N, at 218 and the method 200 returns to operation 214. In some embodiments, the value of d is incremented from 0 to $d_{max}$/N with a step of change in d ($\delta d$).

It is determined if g<20 in response to the depth d not less than $d_{max}$/N, at 220. A value of g is incremented, in response to g<20, at 222. In some embodiments, the value of g is incremented from 1 to 20 with a step of 0.05.

Furthermore, a value of N is incremented in response to g not less than 20, at 224 and the method returns to operation 204. In particular embodiments, the value of N is incremented from 0 to infinity with a step of 1. If the method determines that the uniformity factor satisfies the requirement for the charging coil, at 214, the method outputs a horizontal and vertical turn distribution of the wireless charging coil, at 226. The horizontal and vertical turn distribution may be displayed (e.g., on a computer or printed display) to a user. The user can use this information to form the wireless charging coil having the horizontal and vertical turn distribution as determined by the method 200.

Figure 12:
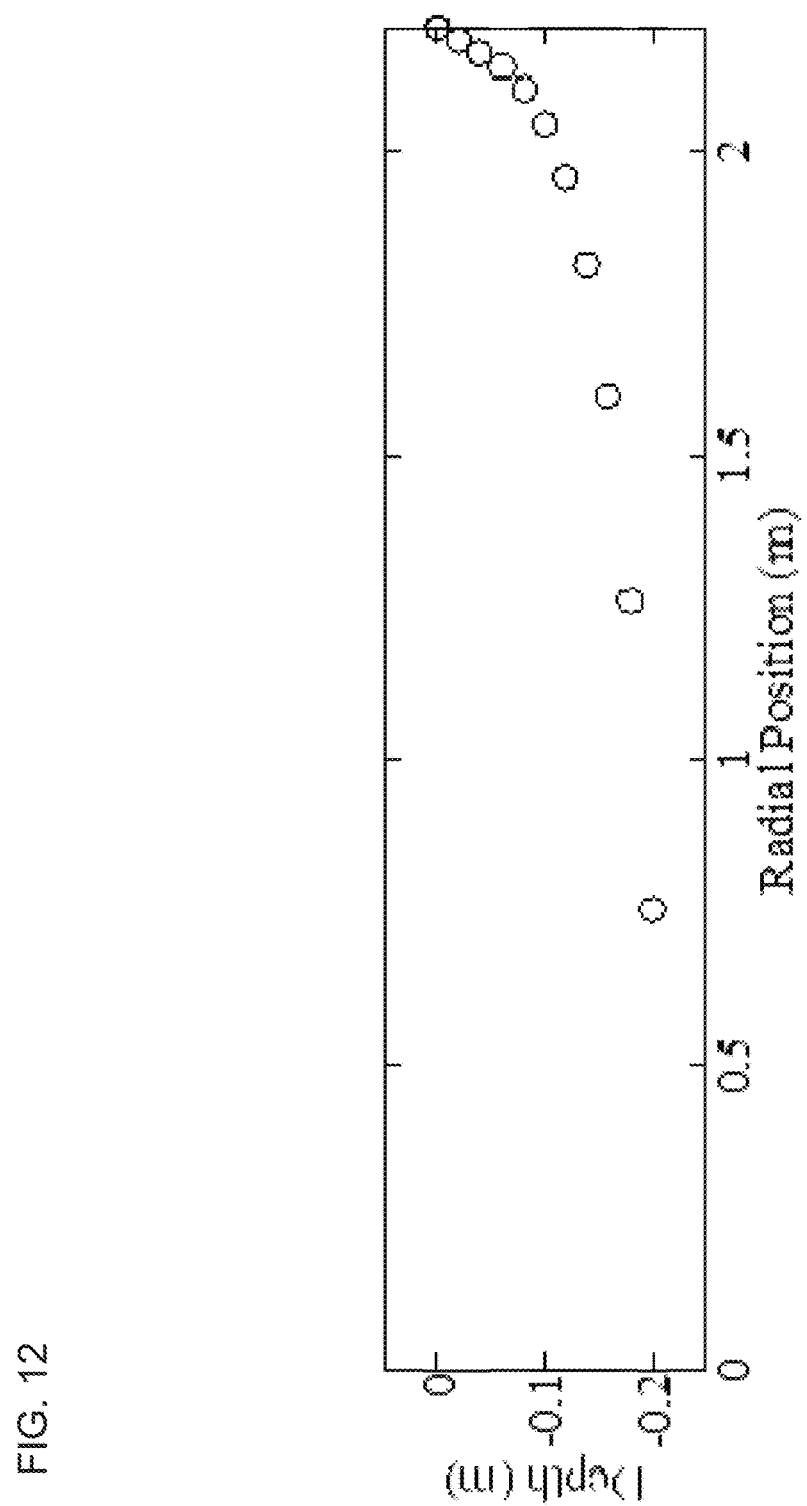
FIG. 12 is a plot of turn distribution of a wireless charging coil determined using the method of FIG. 11.
Figure 13:
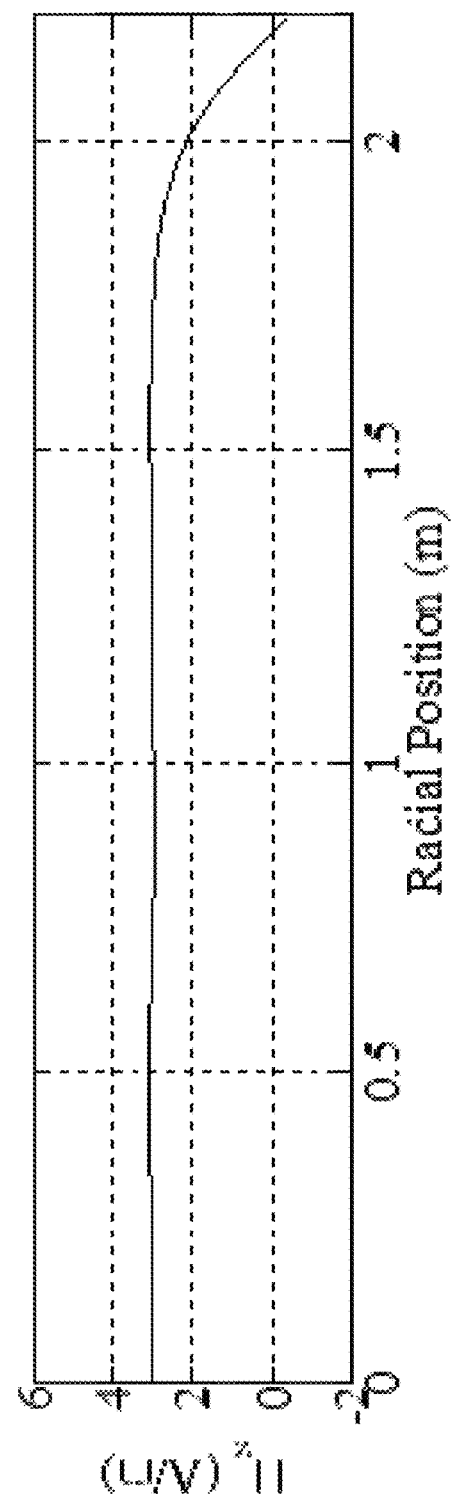
FIG. 13 is a plot of magnetic field strength of a charging coil along the radial direction of the charging coil which has a depth of about 0.2 meters.

FIG. 12 shows a coil turn distribution of a funnel shaped wireless charging coil determined using the method 200. The coil is structured to be disposed in a standard-sized parking spot which is 5.48 meters×2.60 meters. The radius of the first coil $r_1$ is set to be 2.2 meters. The operation plane is set with a height of 0.2 meters above the ground and the maximum coil depth is set at 0.35 meters. The grid search step size $\delta_{12}$ is set at 0.01 meters and $\delta d$ is set at 0.02 meters. Based on the method 200, it is determined that a funnel shaped coil which has a first coil radius $r_1$ of 2.2 meters and depth of 0.2 meters has 11 turns to produce a uniform magnetic field. FIG. 13 shows the axial field strength curve of the coil of FIG. 12 along a radial direction of the coil. The magnetic field is fairly uniform, having a uniformity factor of 7.6%.

Figure 14:
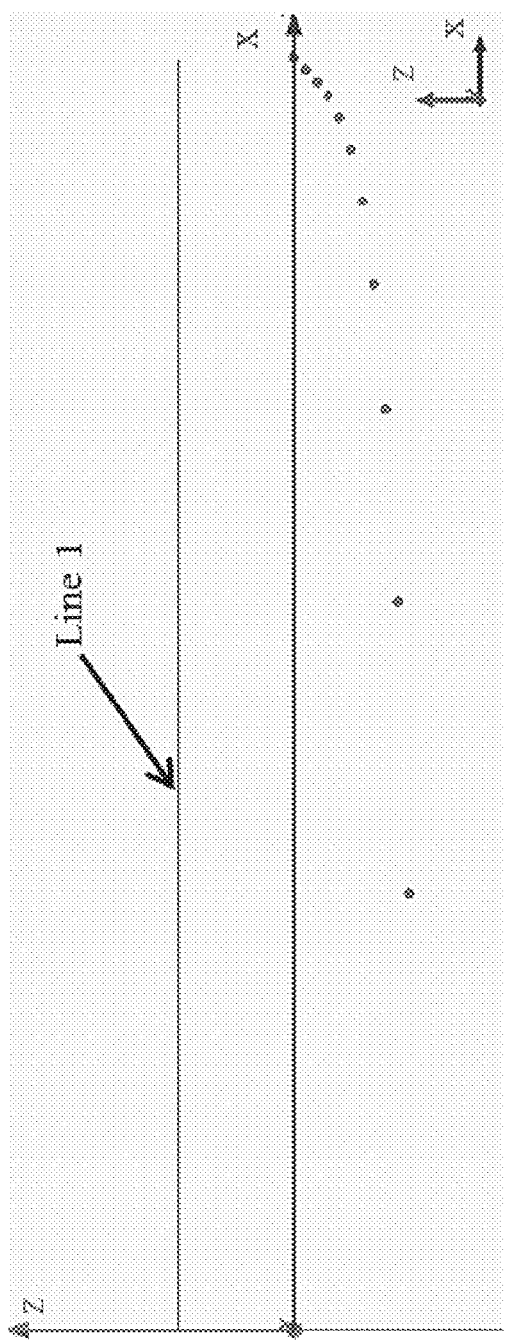
FIG. 14 is a two dimension axisymmetric finite element analysis (FEA) model of a funnel shaped wireless charging coil having a radius of 2.2 meters and depth of 0.2 meters.
Figure 15:
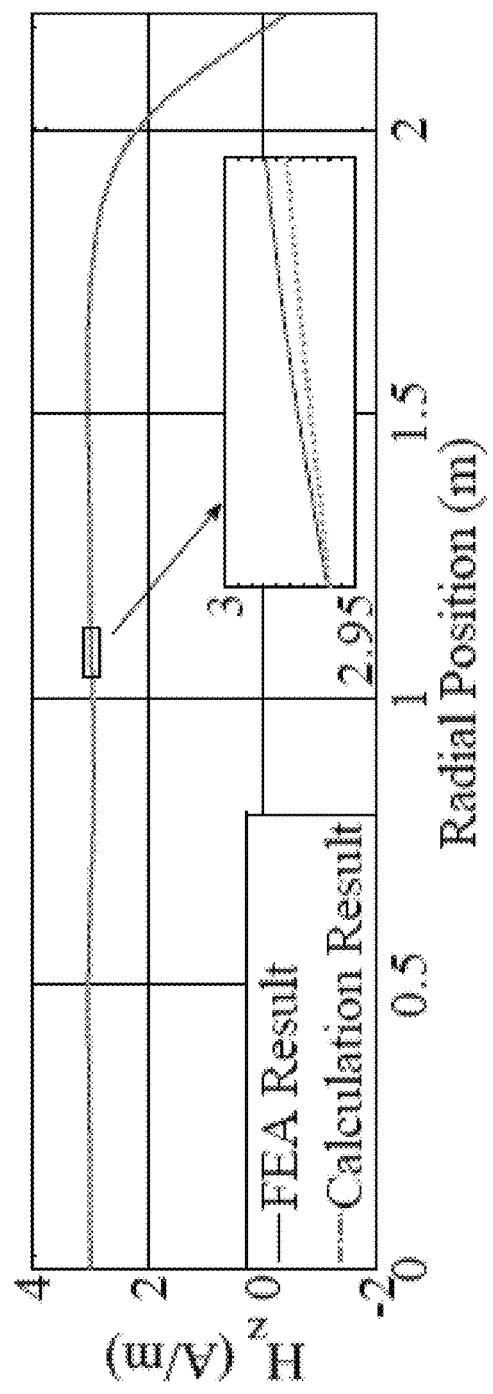
FIG. 15 is a plot showing magnetic field of the coil of FIG. 14 obtained using FEA and from calculations.

Finite element analysis (FEA) is performed to validate the magnetic field of the coil of FIG. 12 determined using the method 200. FIG. 14 shows a 2D FEA axisymmetric model of a funnel shaped charging coil. The magnetic field $H_z$ of the coil is measured along Line 1. FIG. 15 shows plots of the calculated magnetic field of the coil of FIG. 13 and the magnetic field determined using the FEA analysis. It can be seen that the calculated and FEA analysis results agree with each other.

Figure 16:
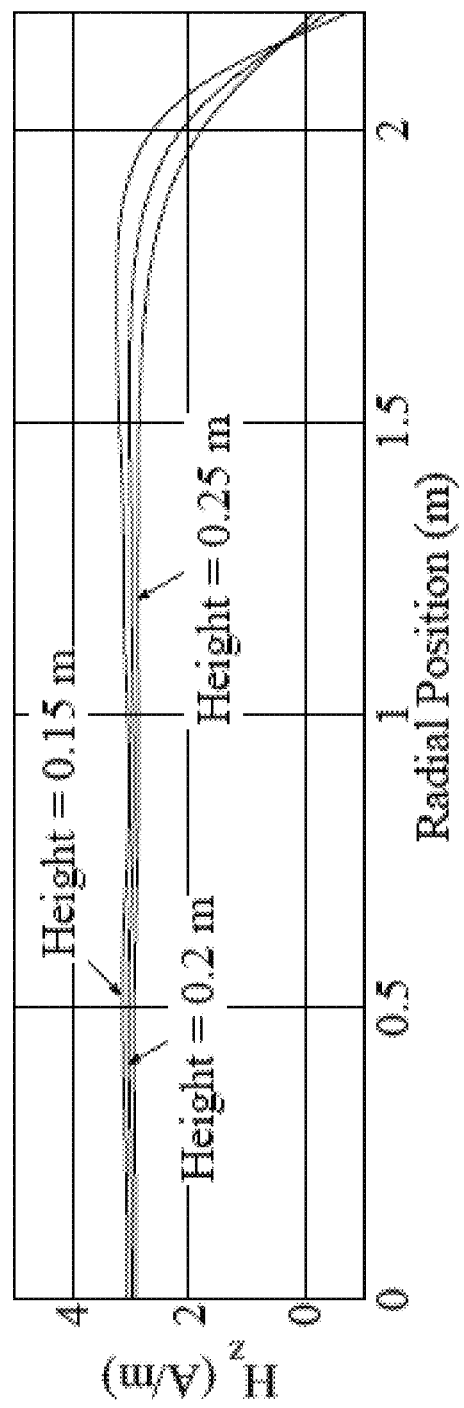
FIG. 16 is a plot of magnetic field strength along a radial direction at various operational plane heights, produced by a charging coil having a radius of 20 meters and 1.08 meters depth, which was originally designed for an operational plane having a height of 0.2 meters.

The height of the operation plane which is fixed when determining a wireless charging coil distribution using method 200 is generally determined by the vehicle ride height and position of the charging receiver on the vehicle. However, in practice, different types of vehicles may require different heights of the operation plane. FIG. 16 shows the field strength curves and the uniformity metrics at different heights above the ground for the coil of FIG. 12. It can be seen that although the coil is designed for a fixed operation plane having a height of 0.2 meters, it can produce fairly uniform magnetic fields at different heights above the ground, which makes it feasible to use one coil design to provide near-ideal uniform magnetic field for charging vehicles with different ride heights and receiver positions. Results of FIG. 16 are summarized in Table I.

TABLE I

Field Uniformity at Different Heights (Coil Radius = 2.2 meters, Depth = 0.2 meters, Operation Plane Height = 0.2 meters)

| Operation Plane Height (meters) | Variance of the Field Strength | Uniformity Factor (%) |
|---|---|---|
| 0.15 | 0.0043 | 7.2 |
| 0.2 | 0.0014 | 7.6 |
| 0.25 | 0.0063 | 15 |

Funnel shaped wireless charging coils having various radii were designed using method 200 and the uniformity of the produced magnetic field of each charging coil is evaluated with results summarized in Table II.

TABLE II

Magnetic Field Parameters of Charging Coils Having
Various Radii (Operation Height = 0.2 meters)

| Radius (R) (meters) | $R_{uniform}/R$ (%) | Depth (meters) | No. of Turns | Variance of Field Strength | Uniformity Factor (%) |
|---|---|---|---|---|---|
| 1.55 | 84 | 0.16 | 9 | 0.0042 | 11.8 |
| 5 | 85 | 0.28 | 15 | 0.0019 | 10 |
| 10 | 88 | 0.48 | 25 | 0.0017 | 9.9 |
| 15 | 85 | 0.62 | 32 | 0.0015 | 8.87 |
| 20 | 85 | 1.08 | 28 | 0.0005 | 9 |

The first charging coil in Table II has a coil with a radius of 1.55 m, which fits the dimension of the economic design configuration for a standard parking spot, as described herein. Table II shows that the magnetic fields produced by coils of varied radii have very good uniformity, which demonstrates that the method 200 can be used to determine the horizontal and vertical turn distributions for coils of any size such that each of the coils produces a uniform magnetic field.

Figure 17A:
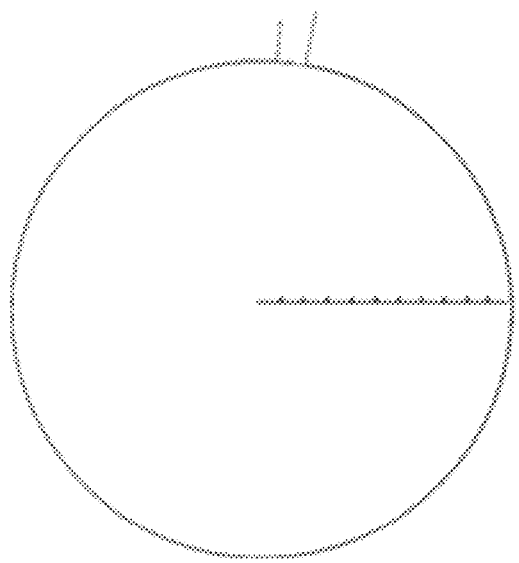
FIG. 17A is top view of a funnel shaped wireless charging coil.
Figure 17B:
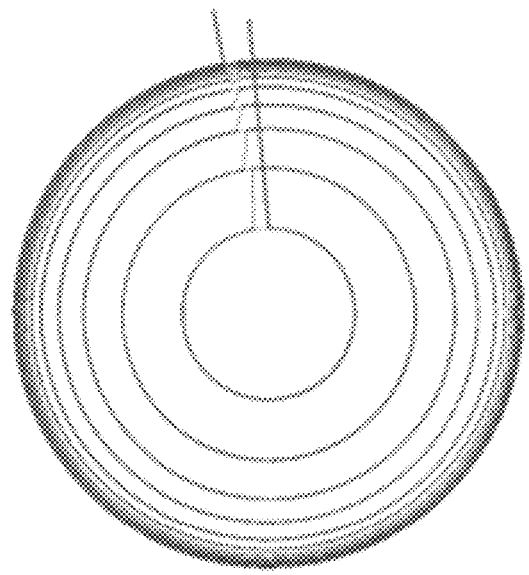

FIG. 17A shows a top view of a funnel shaped wireless charging coil having a horizontal and vertical turn distribution determined using the method 200. FIG. 17B shows a bottom view and FIG. 17C shows a side view of the funnel shaped wireless charging coil of FIG. 17A. The coils is formed from Litz wire. The coil's overall radius is about 22 centimeters, the depth of coil and the height of the operation plane are about 2 centimeters. The coil is shaped by a plastic core including circular plastic pieces of different radii. A distance between each of the plastic pieces is about 2 mm. Because the electromagnetic field for circular wireless charging coils of different radii follows the same behavior, only the radial direction is selected for gathering experimental data on the magnetic strength, indicated by the dots in FIG. 17A.

Figure 18A:
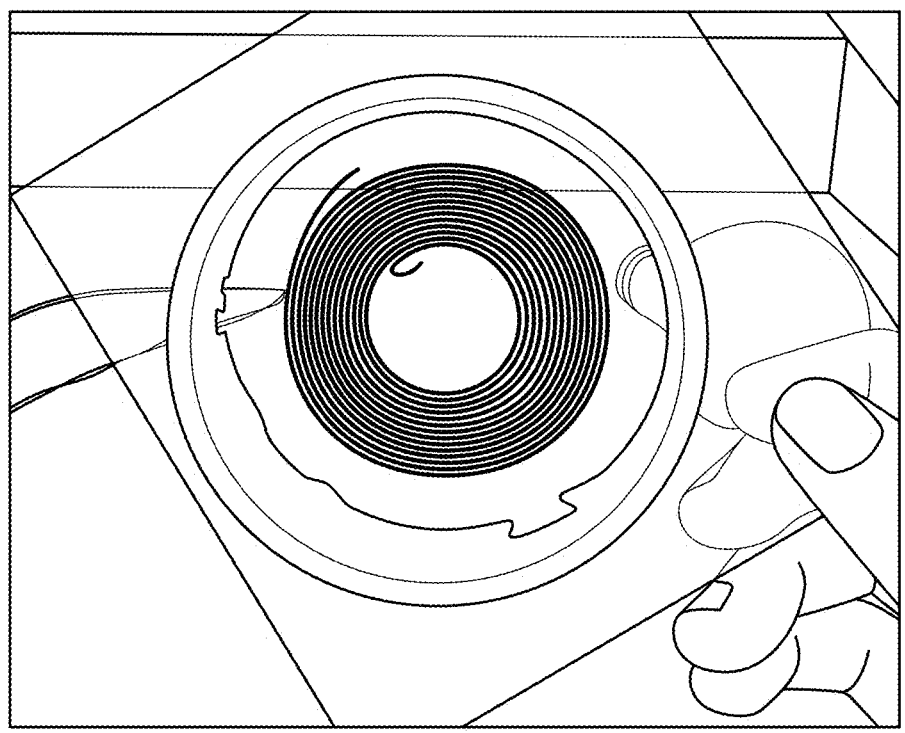
FIG. 18A-B are images of two receiving coils.
Figure 18B:
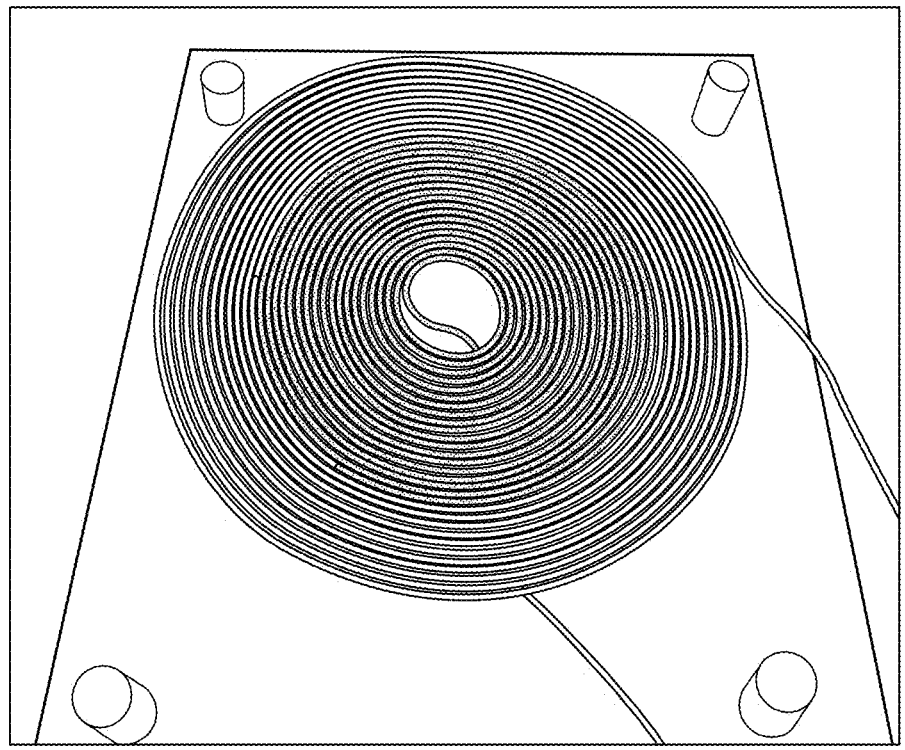

Two receiver coils were used in the experiments. They are made by the same Litz wires as the wireless charging coil. One receiver coil acts as electromagnetic field probe which is shown in FIG. 18A and the other one is used for power transfer which is shown in FIG. 18B. The electromagnetic field probe coil has 11 turns and the power transfer coil has 30 turns. The inner and outer radii of the probe coil are 1.3 cm and 2.9 cm respectively. The inner and outer radii of the power transfer coil are 1.3 cm and 8 cm.

Figure 19:
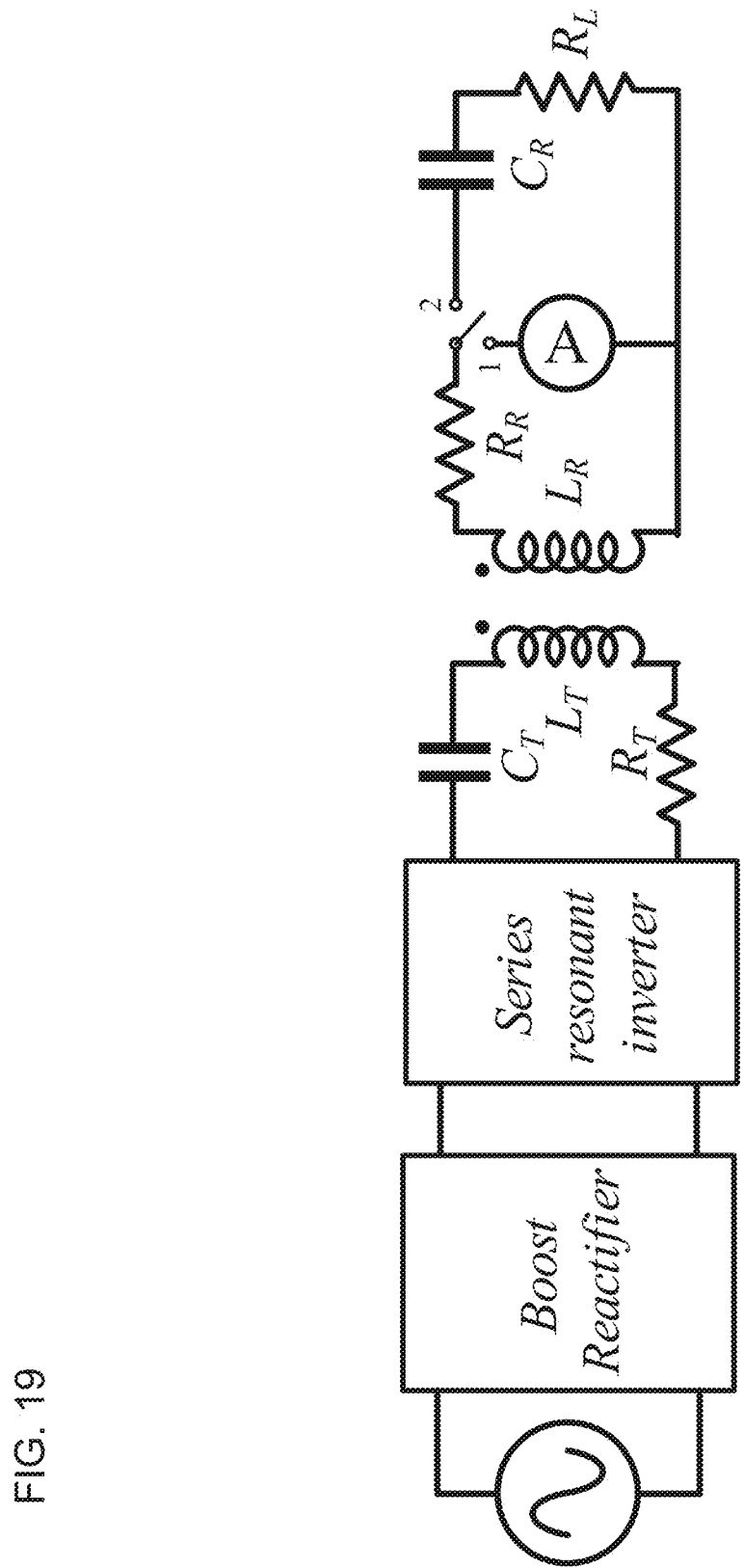
FIG. 19 is a schematic of an electrical circuit diagram of an experimental wireless power transfer system.

No load tests and light load tests are performed using the wireless charging coil, the electromagnetic field probe and the power transfer coil described herein. A three phase series resonant inverter is used as the primary source in all experiments. A schematic circuit diagram of the experimental circuit is shown in FIG. 19.

The frequency of the source is equal to the resonance frequency of the capacitor and the wireless charging coil, so that:

$$f = \frac{1}{2\pi\sqrt{L_T C_T}} \quad (7)$$

A summary of the parameters and component values can be found in Table III.

TABLE III

Parameters and component values of the experimental circuit.

| Parameter | Value |
|---|---|
| $L_T$ [μH] | 69 |
| $L_R$ [μH] | 6.53 |
| f [kHz] | 93.6 |
| Transmitter Peak Current [A] | 5.35 |

Figure 20:
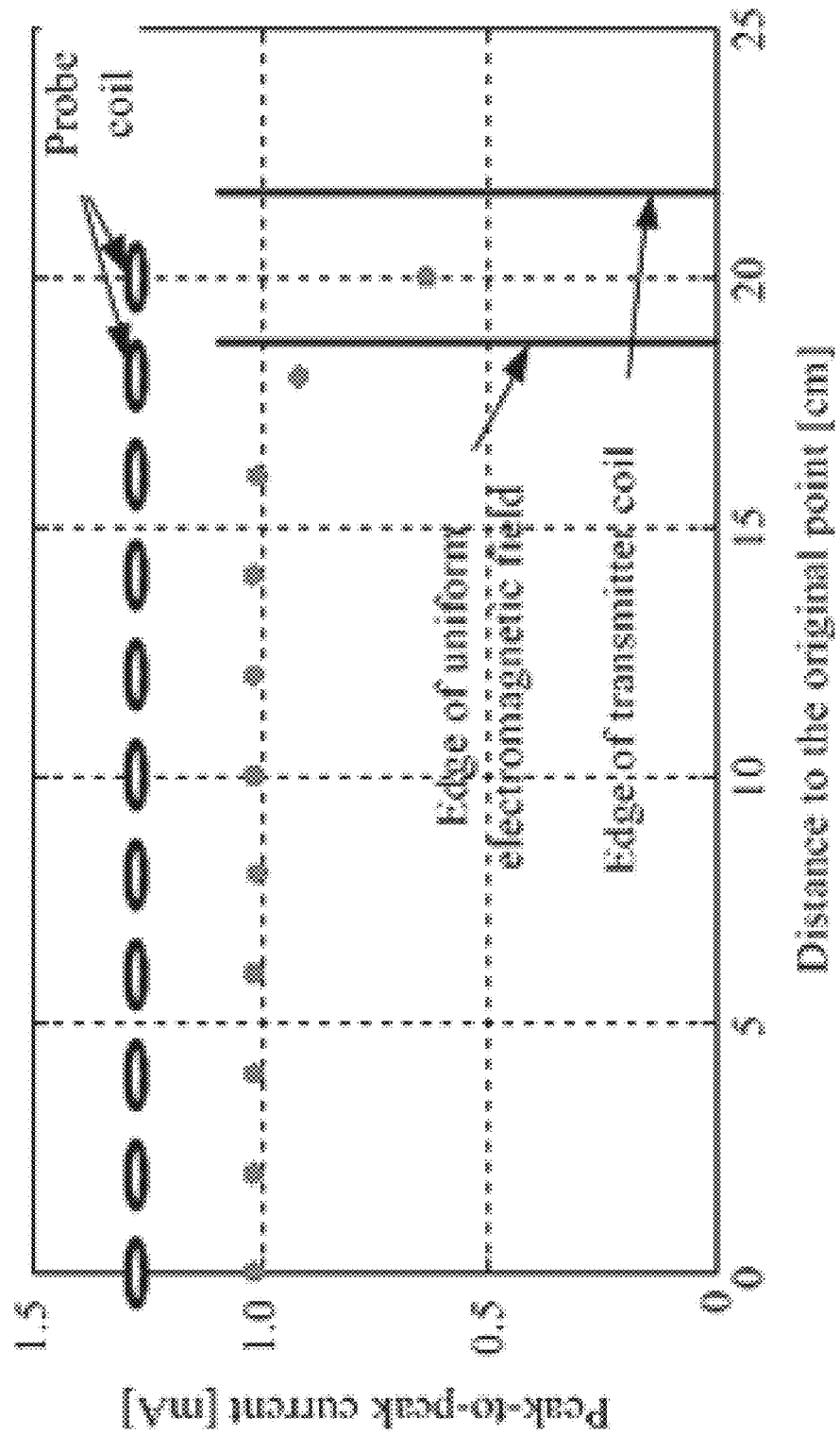
FIG. 20 is a plot showing peak-to-peak current induced in the receiver coil of FIG. 18A using the charging coil of FIG. 17A-C at various distances between a central axis of the charging coil and the receiver coil during a no load test.

The purpose of the no load test is to validate the uniformity of the wireless charging coil formed using the methods described herein. A probe receiver (see FIG. 18A) is used to measure the designed electromagnetic field. By moving the probe receiver along the black line in FIG. 17, the peak-to-peak current can be measured from the receiver side. The peak-to-peak current measured from the receiver side can be seen as an indicator of the electromagnetic field generated by the wireless charging coil. The experimental results are shown in FIG. 20. Accordingly, the electromagnetic field is almost perfectly uniform within a circuit whose radius is 16 cm.

Mutual Inductance Verification

A comparison between calculation formulae, simulations, and experimental results is performed in this section. The mutual inductance between two coils can be defined as:

$$M_n = \frac{\Phi_n}{I_T} \quad (8)$$

where $I_T$ is the current in wireless charging coil and $\Phi_n$ denotes the magnetic flux through the $n^{th}$ turn of the receiver coil due to $I_T$. The magnetic flux $\Phi_n$ may be computed from:

$$\Phi_n = \oint \vec{B} \cdot d\vec{S}_n = \oint B_Z \cdot dS_n = \oint \mu_0 H_Z(x) \cdot dS_n \quad (9)$$

where x is the horizontal distance between a given point inside the $n^{th}$ turn of the receiver coil and the wireless charging coil axis on the operation plane. $S_n$ is the area of the $n^{th}$ turn of the receiver coil. $H_Z(x)$ is calculated with (1).

The mutual inductance between wireless charging coil and receiver is the sum of the mutual inductance between the wireless charging coil and each turn of the receiver coil given by:

$$M = \sum_{n=1}^{N_R} M_n \quad (10)$$

where $N_R$ is the total number of turns of the receiver coil.

Figure 21:
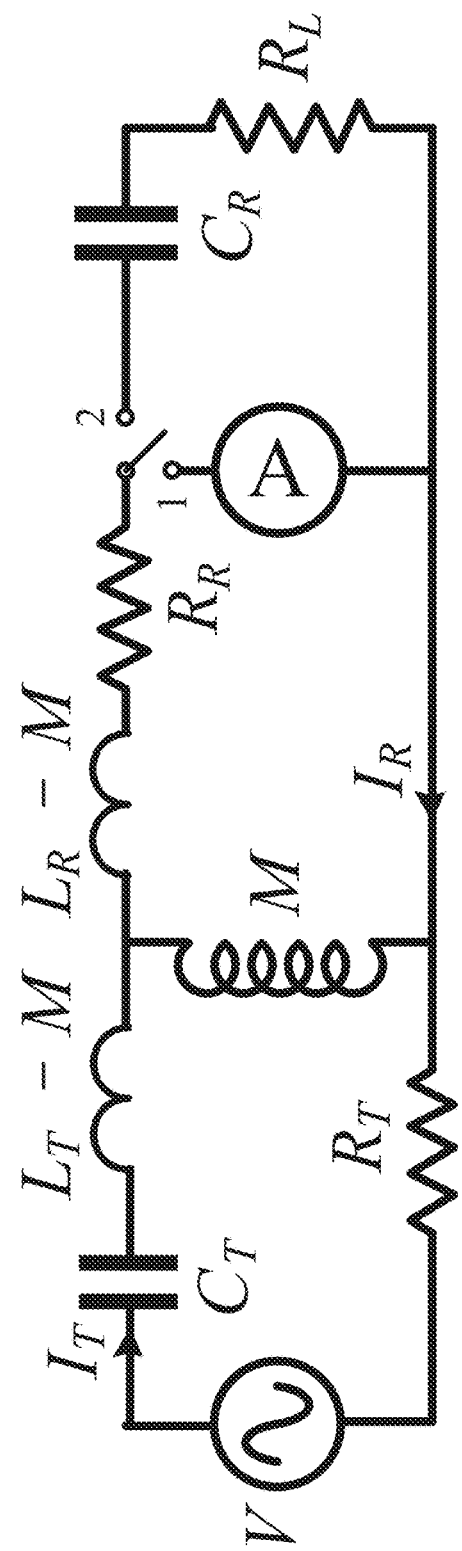
FIG. 21 is a schematic of an equivalent electrical circuit diagram of a wireless power transfer system.

The mutual inductance in these experiments is calculated based on the current in the receiver coil. The equivalent circuit of the no load test circuit is shown in FIG. 21. Based on Kirchoff's current law (KCL), when the switch closes to terminal 1, then:

$$(j\omega L_R + R_R)I_R + j\omega M I_T = 0 \quad (11)$$

Solving M from (11) yields:

$$M = \frac{(j\omega L_R + R_R)I_R}{j\omega I_T} \quad (12)$$

By neglecting the line resistance $R_R$, M can be computed from:

$$M = \frac{I_R}{I_T} L_R \quad (13)$$

Figure 22:
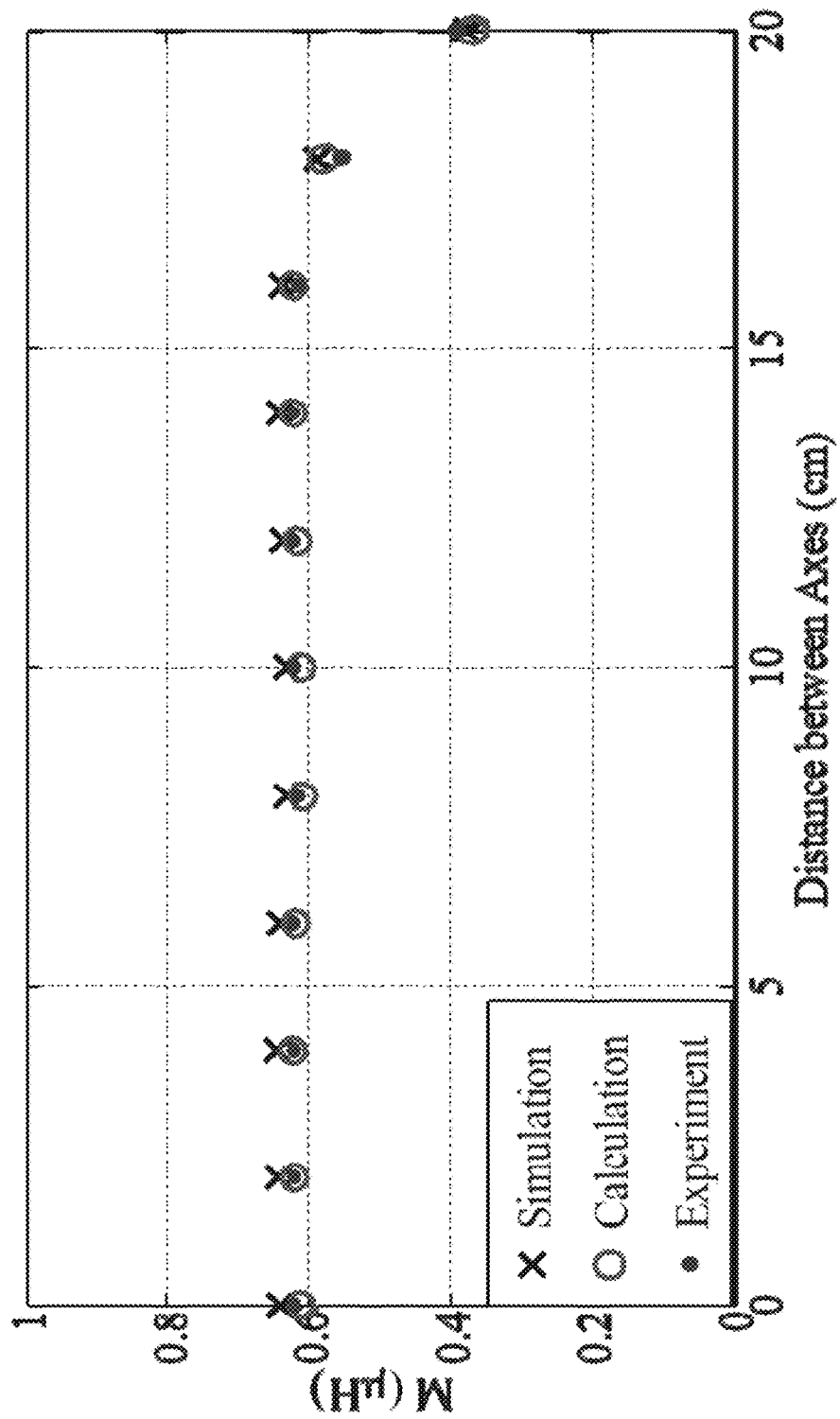
FIG. 22 is a plot comparing the mutual inductance between power transfer and receiving coil obtained using FEM simulations, analytical calculations and experimental results for the no load test of FIG. 20.

The comparison of the mutual inductances obtained from equations (10), (13), and FEM simulations is shown in FIG. 22. FIG. 22 shows that the theoretical analysis is validated perfectly by experimental results.

Light Load Test

Figure 23A:
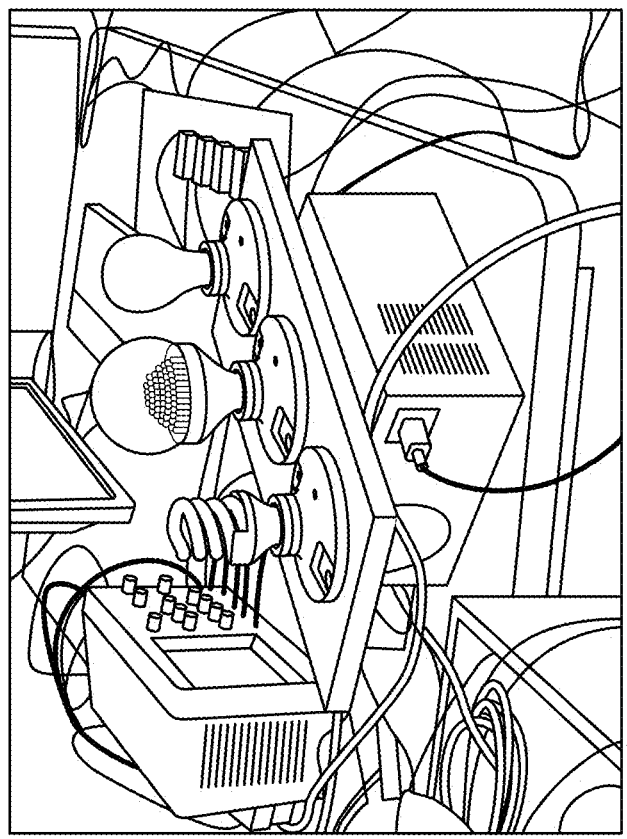
FIG. 23A is an image of an experimental setup for demonstrating electrical power transfer using the wireless power transfer coil.
Figure 23B:
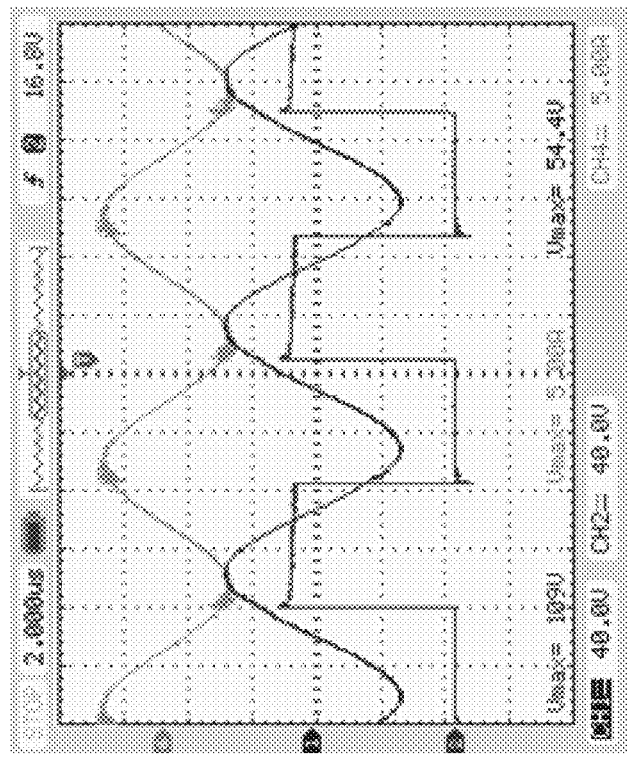
FIG. 23B are plots of the input voltage and current waveforms provided to the power transfer coil.
Figure 24:
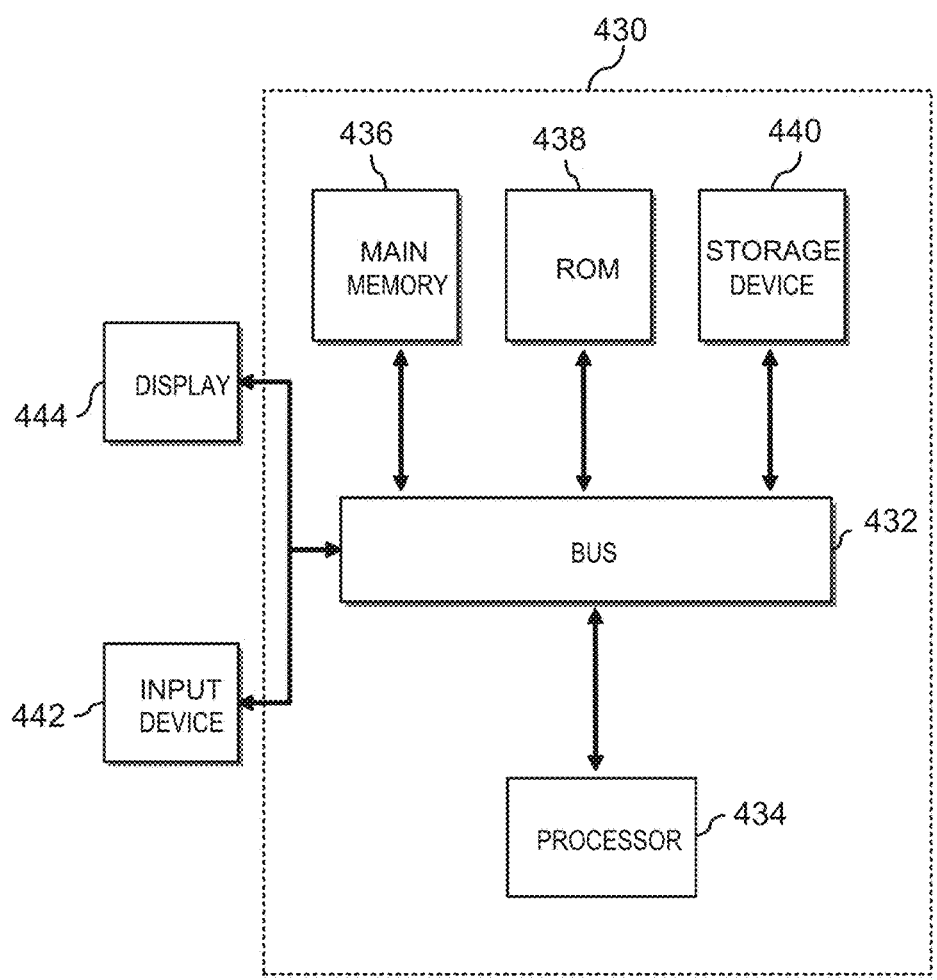
FIG. 24 is a schematic block diagram of computing device specifically programmed to execute instructions stored on a computer readable medium related to methods for determining horizontal and vertical turn distribution of a wireless charging coil.

The power transfer properties are also validated using a larger receiver coil with more turns. A resonant capacitor bank is also designed for improving the power transfer efficiency. According to the experimental results shown in FIG. 23A, the power is successfully transferred wirelessly. The instantaneous voltage and current of the receiver coil are presented in FIG. 23B Any of the methods defined herein can be executed on a stored on a computer readable medium and executed by a computing device specifically programmed to execute the instructions stored on the computer readable medium. FIG. 24 is a block diagram of a computing device 430 in accordance with an illustrative implementation. The computing device 430 includes a bus 432 or other communication component for communicating information and a processor 434 or processing circuit coupled to the bus 432 for processing information. The computing device 430 can also include one or more processors 434 or processing circuits coupled to the bus 432 for processing information. The computing device 430 also includes a main memory 436, such as a random access memory (RAM) or other dynamic storage device, coupled to the bus 432 for storing information, and instructions to be executed by the processor 434. Main memory 436 can also be used for storing position information, temporary variables, or other intermediate information during execution of instructions by the processor 434. The computing device 430 may further include a read only memory (ROM) 438 or other static storage device coupled to the bus 432 for storing static information and instructions for the processor 434. A storage device 440, such as a solid-state device, magnetic disk or optical disk, is coupled to the bus 432 for persistently storing information and instructions.

The computing device 430 may be coupled via the bus 432 to a display 444, such as a liquid crystal display, or active matrix display, for displaying information to a user. An input device 442, such as a keyboard including alphanumeric and other keys, may be coupled to the bus 432 for communicating information and command selections to the processor 434. In another implementation, the input device 442 has a touch screen display 444. The input device 442 can include a cursor control, such as a mouse, a trackball, or cursor direction keys, for communicating direction information and command selections to the processor 434 and for controlling cursor movement on the display 444.

According to various implementations, the processes and methods described herein can be implemented by the computing device 430 in response to the processor 434 executing an arrangement of instructions contained in main memory 436. Such instructions can be read into main memory 436 from another non-transitory computer-readable medium, such as the storage device 440. Execution of the arrangement of instructions contained in main memory 436 causes the computing device 430 to perform the illustrative processes described herein. One or more processors in a multi-processing arrangement may also be employed to execute the instructions contained in main memory 436. In alternative implementations, hard-wired circuitry may be used in place of or in combination with software instructions to effect illustrative implementations. Thus, implementations are not limited to any specific combination of hardware circuitry and software.

Although an example computing device has been described in FIG. 24, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the disclosure have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present disclosure.

What is claimed is:

1. A non-transitory computer readable medium for determining horizontal and vertical turn distributions of a wireless charging coil, when executed by a computing device, cause the computing device to perform operations, comprising:
   setting a number of turns (N) of the wireless charging coil equal to 0 and a parameter g equal to 0;
   calculating an initial turn distribution of the wireless charging coil;
   adjusting a horizontal turn distribution of the wireless charging coil;
   setting a vertical turn distribution of the wireless charging coil;

removing redundant turns of the wireless charging coil;
setting a depth (d) of the wireless charging coil equal to 0;
determining if a uniformity factor of the wireless charging coil satisfies a predetermined requirement;
determining if the depth d<a maximum depth ($d_{max}$)/N, in response to the uniformity factor not satisfying the predetermined requirement;
incrementing a value of d in response to d<a maximum depth ($d_{max}$)/N;
determining if g<20, in response to d not less than $d_{max}$/N;
incrementing a value of g, in response to g<20;
incrementing a value of N, in response to g not less than 20;
determining horizontal and vertical turn distribution of the wireless charging coil, in response to the uniformity factor satisfying the predetermined requirement; and
displaying the horizontal and vertical turn distribution of the wireless charging coil to a user.

2. The computer readable medium of claim 1, wherein the wireless charging coil is funnel shaped.

3. The computer readable medium of claim 1, wherein the turns include a plurality of circular turns aligned along a longitudinal axis of the wireless charging coil.

4. The computer readable medium of claim 1, wherein the predetermined requirement of the uniformity factor includes the uniformity factor being less than 12%.

5. The computer readable medium of claim 1, wherein the value of N is incremented from 0 to infinity with a step of 1.

6. The computer readable medium of claim 1, wherein the value of g is incremented from 1 to 20 with a step of 0.05.

7. The computer readable medium of claim 1, wherein the value of d is incremented from 0 to $d_{max}$/N with a step of change in d (δd).

8. The computer readable medium of claim 1, wherein the removing of the redundant turns of the wireless charging coil is performed until the uniformity factor satisfies at least one of a near ideal uniformity condition, or 20% of the turns in the wireless charging coil are removed.

9. A system for wirelessly charging an electric vehicle, comprising;
a wireless charging coil having a first end, a second end, and a plurality of turns, the first end having a first turn and the second end having an $N^{th}$ turn, the first turn having a first radius $r_1$ and the $N^{th}$ turn having an $N^{th}$ radius $r_N$, $r_N < r_1$ such that the wireless charging coil is funnel shaped,
wherein, an ascending distance between each adjacent turn of the wireless charging coil is:

$$\Delta'_{j,j+1} = \Delta_{j+i-3, j+i-2} + (\Delta'_{34} - \Delta_{i,i+1}), \text{for } j \geq 4 \text{ and } r'_{j+1} > 0$$

wherein,
$\Delta'_{j,j+1} = r'_j - r'_{j+1}$ is the distance between adjacent turns,
i is 2 to N;
j is 1 to N;
$\Delta'_{34}$ is an ascending distance between the third turn and the fourth turn
$\Delta_{j+i-3, j+i-2}$ is the distance between adjacent turns; and
$\Delta_{i,i+1}$ is the distance between adjacent turns.

10. The system of claim 9, wherein the distance between the first turn $r_1$ and a second turn $r'_2$ is between 0.25% and 0.9% of $r_1$ such that a variance of a field strength $H_z(x)$(var(Hz)) is minimized, wherein, $$\text{var}(H_z) = \frac{1}{M} \sum_{i=1}^{M} (H_z(x_i) - \overline{H_z(x_i)})^2$$

where,
$x_i$ is between 0 and $0.84 r_1$;
$\overline{H_3(x_i)}$ is the average of field strength at the sampled points.

11. The system of claim 10, wherein a uniformity factor ($\lambda_{uniform}$) of the wireless charging coil is less than 12%.

12. The system of claim 9, wherein the plurality of turns include a plurality of circular turns aligned along a longitudinal axis of the wireless charging coil.

* * * * *